United States Patent
Niwa et al.

(12) United States Patent (10) Patent No.: US 7,187,509 B2
(45) Date of Patent: Mar. 6, 2007

(54) COLOR WHEEL AND MANUFACTURING METHOD OF SAME

(75) Inventors: Shinichi Niwa, Fukuroi (JP); Toshinori Chino, Fukuroi (JP); Jiro Omori, Fukuroi (JP); Kuniyuki Takao, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 11/347,387

(22) Filed: Feb. 6, 2006

(65) Prior Publication Data

US 2006/0176593 A1 Aug. 10, 2006

(30) Foreign Application Priority Data

Feb. 10, 2005 (JP) .............................. 2005-034696

(51) Int. Cl.
*G02B 5/22* (2006.01)
*G02B 7/00* (2006.01)

(52) U.S. Cl. .................. 359/892; 359/885; 359/891; 348/743; 356/418; 353/84; 362/293

(58) Field of Classification Search ................ 359/891, 359/892, 885, 889; 348/743; 356/418; 353/84; 362/293

See application file for complete search history.

(56) References Cited

U.S. PATENT DOCUMENTS

| | | | |
|---|---|---|---|
| 4,800,474 A * | 1/1989 | Bornhorst | 362/293 |
| 5,257,332 A | 10/1993 | Pimpinella | |
| 5,868,482 A | 2/1999 | Edlinger et al. | |
| 6,011,662 A | 1/2000 | Evans | |
| 6,024,453 A | 2/2000 | Edlinger et al. | |
| 6,574,046 B1 | 6/2003 | Shioya | |
| 6,702,446 B2 | 3/2004 | De Vaan et al. | |
| 6,715,887 B2 | 4/2004 | Chang | |
| 6,813,087 B2 | 11/2004 | Davis | |
| 6,958,870 B1 * | 10/2005 | Nguyen | 359/892 |
| 2002/0005914 A1 | 1/2002 | Tew | |
| 2002/0105729 A1 | 8/2002 | Richards et al. | |
| 2003/0142241 A1 | 7/2003 | Allen et al. | |
| 2004/0095767 A1 | 5/2004 | Ohmae et al. | |
| 2004/0102720 A1* | 5/2004 | Kellerman et al. | 600/585 |
| 2005/0018145 A1 | 1/2005 | Kwon et al. | |

FOREIGN PATENT DOCUMENTS

JP A 2001-73136 7/1990

(Continued)

*Primary Examiner*—Leonidas Boutsikaris
(74) *Attorney, Agent, or Firm*—Oliff & Berridge, PLC (57) ABSTRACT

There is provided a color wheel which includes: a color filter disk having a side surface; and a rotary member having a circumferential surface and adhesively attached to the center portion of the color filter disk. In the color wheel described above, a portion of an adhesive for fixing the rotary member to the color filter disk sticks out on the side surface of the color filter disk along the circumferential surface of the rotary member, and the portion of the adhesive sticking out, when hardened, functions as a barrier to prevent uncured portions, if any, of the adhesive present between the two components from getting scattered out in the radial direction on the side surface of the color filter disk when the color wheel is rotated at a high speed during the inspection process, thus improving the production yield rate.

5 Claims, 6 Drawing Sheets

FOREIGN PATENT DOCUMENTS

| | | |
|---|---|---|
| JP | A 3-122903 | 5/1991 |
| JP | A 5-90391 | 4/1993 |
| JP | A 6-347639 | 12/1994 |
| JP | A 10-48542 | 2/1998 |
| JP | A 11-115711 | 4/1999 |
| JP | A 11-222664 | 8/1999 |
| JP | A 2000-239830 | 9/2000 |
| JP | A 2003-2003-50309 | 2/2003 |
| JP | A 2003-57424 | 2/2003 |
| JP | 2004-101827 | 4/2004 |
| WO | WO 94/25796 | 11/1994 |

* cited by examiner

COLOR WHEEL AND MANUFACTURING METHOD OF SAME

BACKGROUND OF THE INVENTION

1. Field of the Invention

The present invention relates to a color wheel suitable as a filter element of a time-share dispersing device, and to a manufacturing method thereof.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into R (red), G (green), and B (blue) lights; or a three-panel method, in which three light valve elements dedicated respectively to R, G and B lights are used to produce R, G and B images in parallel, and then the three images thus produced are composed. Recently, as a light valve element capable of fast switching, such as a ferroelectric liquid crystal display element or a digital micro-mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner.

Figure 4A:
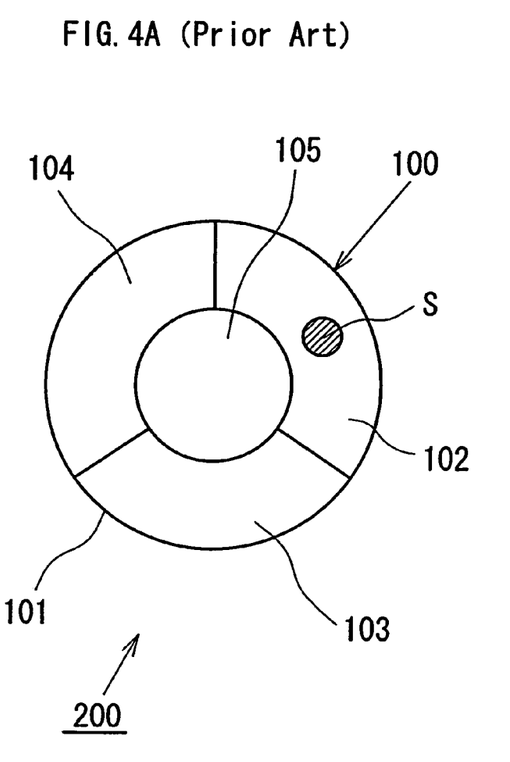
FIGS. 4A and 4B are respectively top plan and side views of a conventional color wheel assembly incorporating a color wheel and a driving motor.
Figure 4B:
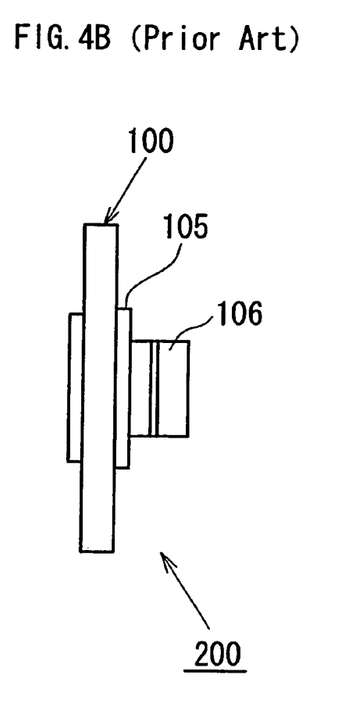

FIGS. 4A and 4B are respectively top plan and side views of a conventional and typical color wheel assembly 200 as a time-share light dispersing device incorporating such a color wheel. Referring to FIG. 4B, the color wheel assembly 200 includes a color wheel 100, and a driving motor 106 provided with a motor hub 105. The color wheel 100 is a tricolor color wheel composed of a disk-like substrate 101 which is made of a light-transmitting material, for example, optical glass, and three pie-shaped (sectorial) filters 102, 103 and 104 which are formed on a surface of the substrate 101, and which transmit exclusively, for example, R, G and B lights, respectively. The color wheel 100 thus structured is fixedly attached to the motor hub 105 coaxially therewith. The color wheel assembly 200 operates such that the color wheel 100 is spun by the driving motor 106 so that white light S impinges sequentially on the filters (R, G and B) 102, 103 and 104 whereby the white light S is sequentially dispersed into R, G and B lights.

There are two types of color wheel structures: a monolithic type structured such that respective color filters are formed on a single disk-like substrate; and a segment type structured such that respective color filter segments separately prepared in a pie shape are fixedly attached to one another so as to form a color filter disk.

Figure 5:
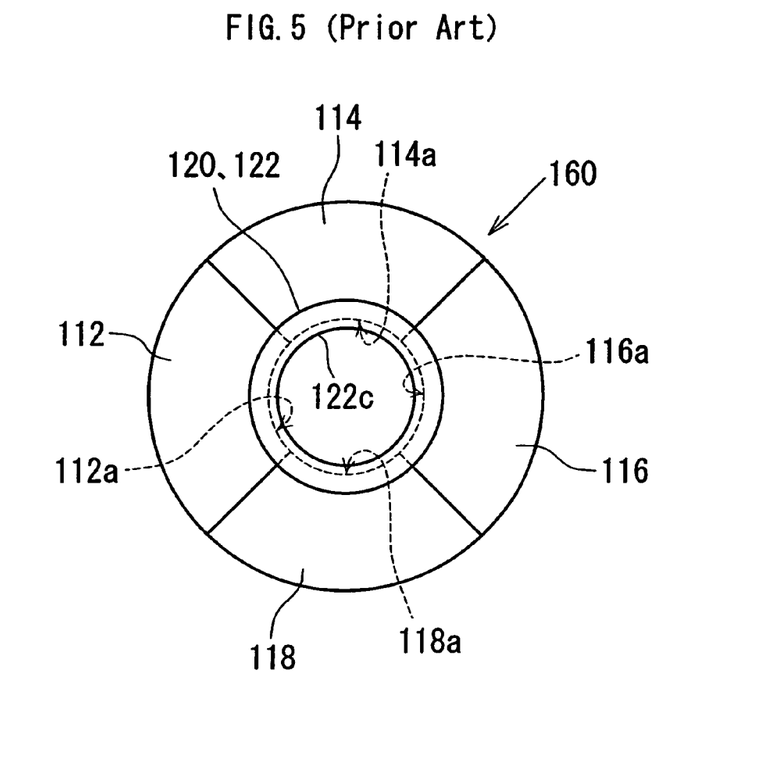
FIG. 5 is a top plan view of a conventional segment-type color wheel.
Figure 6:
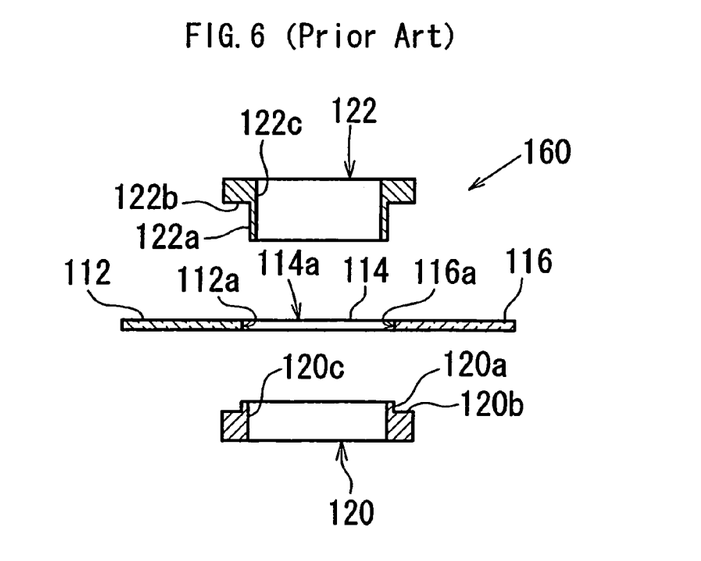
FIG. 6 is an exploded side sectional view of the color wheel of FIG. 5.

FIGS. 5 and 6 show respectively top plan and exploded side sectional views of a segment type color wheel 160 including a plurality (four in FIG. 5) of sectorial color filter segments 112, 114, 116 and 118 which are separately prepared and are fixed in position by means of a support member 120 and a clamp member 122 so as to form a color filter disk.

Specifically, as shown in FIG. 6, respective inner circumferences 112a, 114a, 116a and 118a of the color filter segments 112, 114, 116 and 118 are fitted to the outer circumference of a smaller cylinder portion 120a of the support member 120 whereby the color filter segments 112, 114, 116 and 118 are duly set in position with respect to the radial direction of the color wheel 160, and surfaces thereof toward the inner circumferences 112a, 114a, 116a and 118a are fitted to an annular seat portion 120b of the support member 120 whereby the color filter segments 112, 114, 116 and 118 are duly set in position with respect to the thickness direction of the color wheel 160. Then, a smaller cylinder portion 122a of the clamp member 122 is engagingly inserted into a hollow 120c of the support member 120 so that an annular seat portion 122b of the clamp member 122 and the aforementioned annular seat portion 120b of the support member 120 sandwich and clamp the inner circumferential portions of the color filter segments 112, 114, 116 and 118. And, when the support member 120 and the clamp member 122 are bonded or screwed together, the color filter segments 112, 114, 116 and 118 are securely fixed in position. The color wheel 160 thus structured is fixedly attached to a hub (such as the hub 105 as shown in FIGS. 4A and 4B) of a motor (such as the driving motor 106 as shown FIG. 4B) such that the hub is inserted in the hollow 122c of the clamp member 122 constituting the color wheel 160 (refer to, for example, Japanese Patent Applications Laid-Open Nos. 2004-101827 ([0010], and FIG. 4) and H10-48542 (claim 1, and FIG. 2).

The segment-type color wheel 160 shown in FIGS. 5 and 6 employs the support member 120 to precisely position and fix the color filter segments 112, 114, 116 and 118, but in some segment-type color wheels, color filter segments are directly fitted to a motor hub of a driving motor (for example, the motor hub 105 of the driving motor 106 as shown in FIGS. 4A and 4B). In any cases of segment-type color wheels, a rotary member having a circumferential surface, such as the support member 120 or the motor hub 105, is fixedly set at the center of the color filter disk constituted by the color filter segments 112, 114, 116 and 118, whereby a color wheel can be rotated at a high speed. On the other hand, a monolithic-type color wheel has an integral structure and does not require a support member, but still a rotary member having a circumferential surface, such as the motor hub 105 of the driving motor 106, has to be attached to the monolithic-type color wheel.

Figure 7:
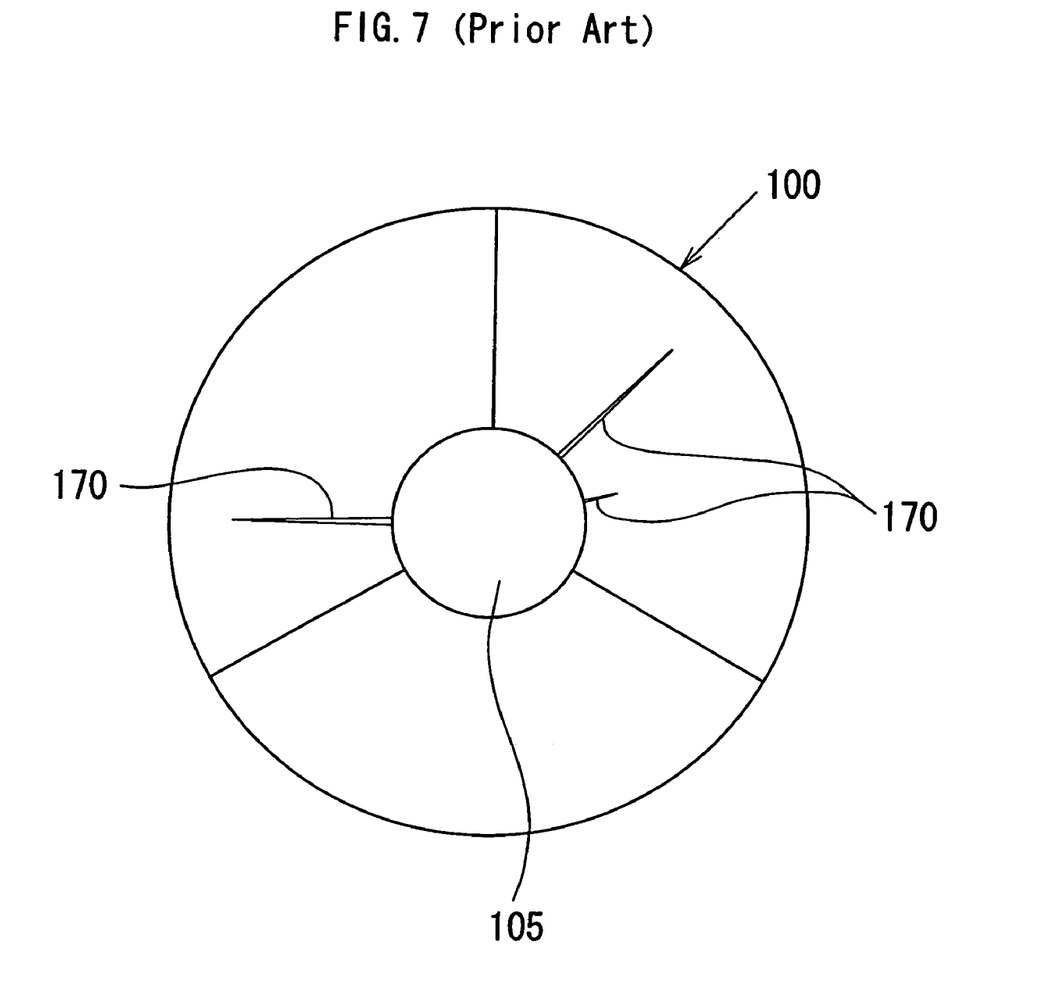
FIG. 7 is an explanatory view of scattered adhesives in the radial direction on a color filter disk produced by a conventional method of manufacturing a color wheel.

In both a monolithic-type color wheel and a segment-type color wheel, a rotary member with a circumferential surface (hereinafter refereed to simply as "a rotary member") is fixed to a color filter disk usually by using adhesive alone or in combination with other fixing methods. If the adhesive applied for fixing the rotary member to the color filter disk is not cured completely, then it can happen that when the color filter disk is rotated at a high speed, for example, at the inspection process, uncured portions of the adhesive are scattered out on the surface of the color filter disk in the radial direction and turn into scattered adhesives 170 as shown in FIG. 7. The scattered adhesives 170, even if minute, have negative effects on the optical characteristics of a light transmitting area, thus lowering the production yield rate of color wheels.

The problem of adhesive scattering is caused by inadequate curing which results from unevenness of adhesive layer thickness or non-uniformity of adhesive application range, or which is attributable to adhesive chambers existing at the joint surfaces of the color filter disk and the rotary member. Also, when the adhesive is UV-curable, the problem of adhesive scattering can happen not only due to an excessive adhesive layer thickness but also to a too scarce adhesive layer thickness which does not allow an ultraviolet ray to duly penetrate through the adhesive layer.

SUMMARY OF THE INVENTION

The present invention has been made in the light of the above problem, and it is an object of the present invention to provide a color wheel of both monolithic type and segment type, in which when a color filter disk and a rotary member are fixed to each other by adhesive, uncured portions of the adhesive are prevented from getting scattered out on the color filter disk, thus improving the production yield rate of color wheels.

In order to achieve the object described above, according to a first aspect of the present invention, there is provided a color wheel which includes: a color filter disk having a side surface; and a rotary member having a circumferential surface and adhesively attached to a center portion of the color filter disk. In the color wheel described above, a portion of an adhesive applied to an interface area between the color filter disk and the rotary member for fixing the rotary member to the color filter disk sticks out on the side surface of the color filter disk along the circumferential surface of the rotary member. The portion of the adhesive sticking out on the side surface of the color filter disk along the circumferential surface of the rotary member, when hardened, functions as a barrier to prevent uncured portions of the adhesive existing between the two components from getting scattered out.

In the first aspect of the present invention, the color filter disk may include a plurality of color filter segments arranged so as to form a disk-like configuration. Thus, the present invention is applicable to a segment-type color wheel.

In the first aspect of the present invention, the adhesive may be applied to keep off gaps each formed between two adjacent pieces of the plurality of color filter segments. Consequently, in the segment-type color wheel, the adhesive can be surely prevented from getting in the gaps between any two adjacent color filter segments.

In the first aspect of the present invention, the adhesive may be photo-curable. A photo-curable adhesive is excellent in handling and enables a final hardening work to be securely conducted in a separate process.

In the first aspect of the present invention, the adhesive may be UV-curable and anaerobic. The adhesive present between the color filter disk and the rotary member is sealed from the air and therefore surely hardened at ambient temperatures thus achieving a secure fixation of both components. On the other hand, the portion of the adhesive sticking out on the side surface of the color filter disk along the circumferential surface of the rotary member is surely hardened with irradiation of an ultraviolet ray, and functions as a barrier to surely prevent uncured portions, if any, of the adhesive from getting scattered out.

According to a second aspect of the present invention, there is provided a manufacturing method of a color wheel which includes: a color filter disk having a side surface; and a rotary member having a circumferential surface and adhesively attached to a center portion of the color filter disk. The manufacturing method includes the steps of: applying an adhesive to a joint surface of the rotary member and/or a joint surface of the color filter disk; fitting and pressing the rotary member to the center portion of the color filter disk so that a portion of the adhesive existing between the rotary member and the color filter disk sticks out on the side surface of the color filter disk along the circumferential surface of the rotary member; and hardening the adhesive. With this manufacturing method, the rotary member can be fixed to the color filter disk, and at the same time the portion of the adhesive sticking out on the side surface of the color filter disk along the circumferential surface of the rotary member, when hardened, functions as a barrier to prevent uncured portions of the adhesive from getting scattered out.

In the second aspect of the present invention, the manufacturing method of a color wheel may further include a step of setting a plurality of color filter segments into a disk-like configuration thereby forming the color filter disk. Thus, the manufacturing method can be applied to a segment-type color wheel.

In the second aspect of the present invention, the adhesive may be applied so as to keep off gaps each formed between two adjacent pieces of the plurality of color filter segments. Consequently, in the segment-type color wheel, the adhesive can be surely prevented from getting in the gaps between any two adjacent color filter segments.

In the second aspect of the present invention, the adhesive may be UV-curable and anaerobic, and the adhesive existing between the rotary member and the color filter disk may be hardened by fitting and pressing the rotary member to the center portion of the color filter disk, while the portion of the adhesive sticking out on the side surface of the color filter disk along the circumferential surface of the rotary member may be hardened by irradiating an ultraviolet ray. The adhesive present between the color filter disk and the rotary member is sealed from the air and therefore surely hardened at ambient temperatures thus achieving a secure fixation of both components. On the other hand, the portion of the adhesive sticking out on the side surface of the color filter disk along the circumferential surface of the rotary member is surely hardened with irradiation of an ultraviolet ray, and then functions as a barrier to surely prevent uncured portions, if any, of the adhesive from getting scattered out.

Thus, in the color wheel according to the present invention, uncured portions of the adhesive applied is prevented from getting scattered out on the side surface of the color filter disk, and the production yield rate is improved by the relevant manufacturing method.

DETAILED DESCRIPTION OF THE PREFERRED EMBODIMENTS

Preferred embodiments of the present invention will be described with reference to the accompanying drawings.

Figure 1:
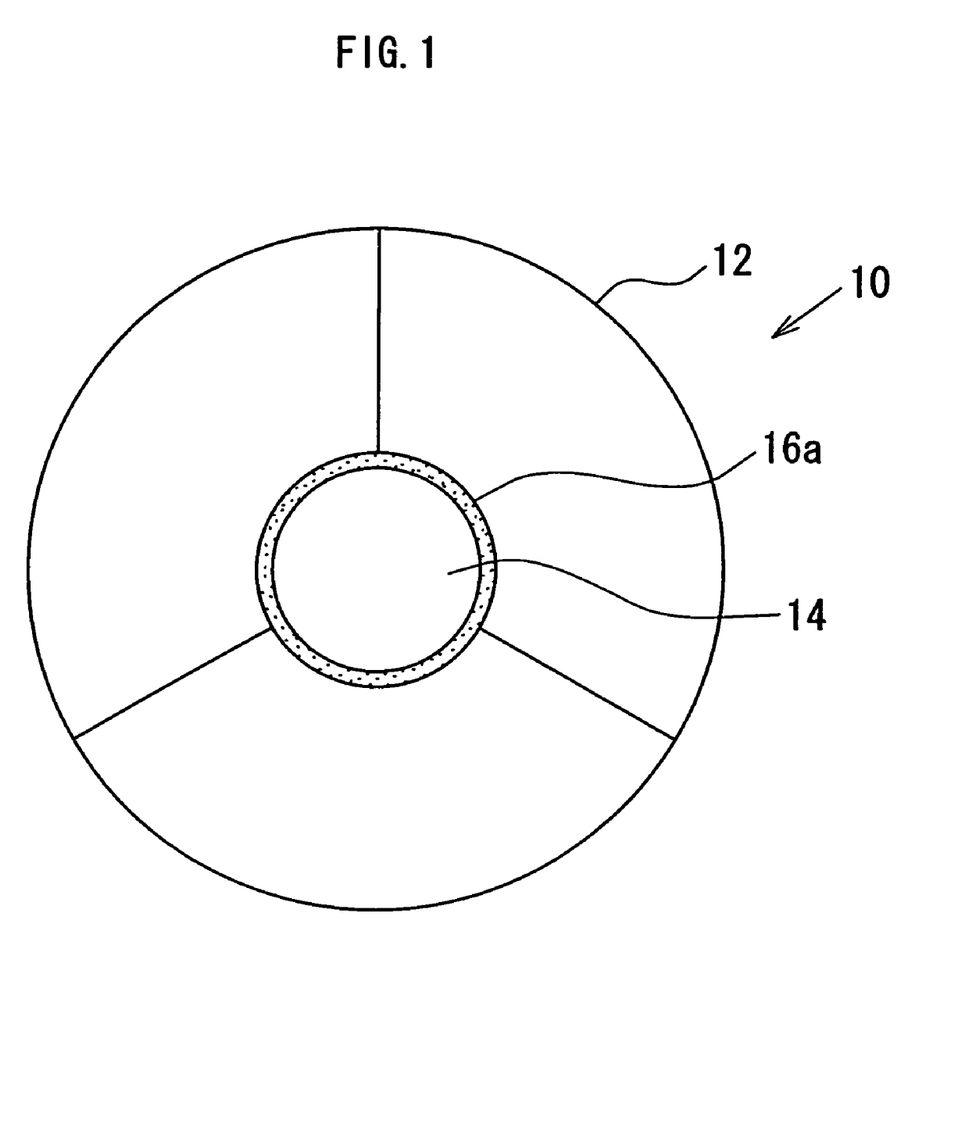
FIG. 1 is a schematic top plan view of a color wheel according to a first embodiment of the present invention.
Figure 2A:
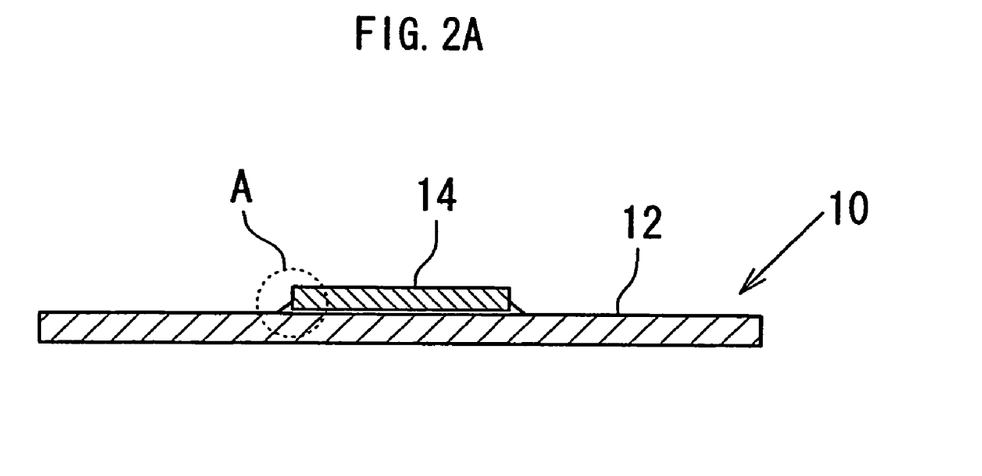
FIG. 2A is a side sectional view of the color wheel of FIG. 1.
Figure 2B:
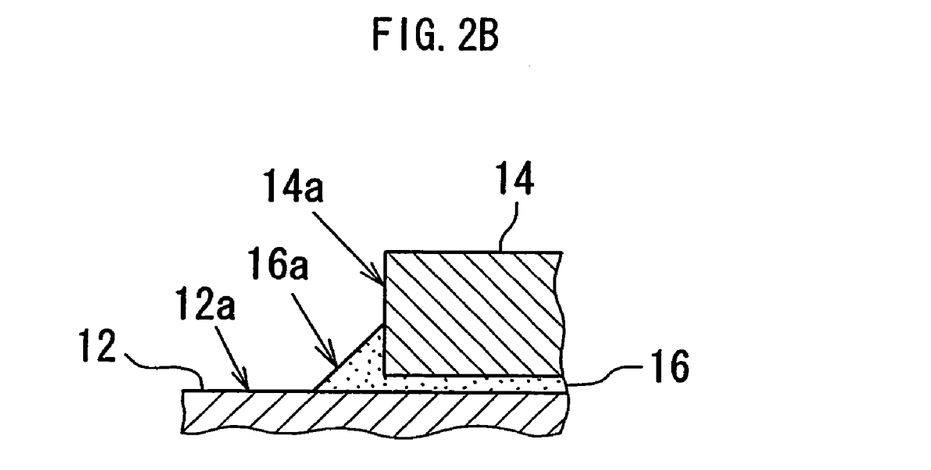
FIG. 2B is an enlarged view of a portion indicated by a dashed circle line A in FIG. 2A.

Referring to FIGS. 1, 2A and 2B, a color wheel 10 according to a first embodiment of the present invention includes a color filter disk 12 having a side surface 12a, and a rotary member (a motor hub schematically shown in the figures) 14 having a circumferential surface 14a and adhesively attached to the center portion of the color filter disk 12. The color wheel 10 is a monolithic-type color wheel, and the color filter disk 12 is made of a single substrate. An adhesive 16, which fixes the color filter disk 12 and the rotary member 14 to each other, has a portion 16a thereof sticking out on the side surface 12a of the color filter disk 12 along the circumferential surface 14a of the rotary member 14. A UV-curable anaerobic adhesive is preferably used for reasons to be described later, but the present invention is not limited to the use of the UV-curable anaerobic adhesive, and a UV-curable epoxy adhesive, a UV-curable adhesive, an anaerobic adhesive or an epoxy adhesive may alternatively be used. And, a light source for curing an adhesive is not limited to a UV wave, and an adhesive which is cured by irradiation of a light having a wavelength different from a UV wavelength may be used as the case may be.

A procedure of manufacturing the color wheel 10 will hereinafter be described.

Step 1: An adequate amount of the adhesive (UV-curable anaerobic adhesive) 16 is applied to the peripheral portion on a side surface of the rotary member 14 facing the color filter disk 12, and a hardening accelerator may be applied to a corresponding portion of the color filter disk 12 when necessary. The adhesive 16 may alternatively be applied to the joint surface of the color filter disk 12, or to the joint surfaces of both the rotary member 14 and the color filter disk 12.

Step 2: The rotary member 14 is fitted to the center portion of the color filter disk 12 and pressed thereto so as to force the adhesive 16 to stick out on the side surface 12a along the circumferential surface 14a thereby forming the portion 16a. When the rotary member 14 is pressed toward the color filter disk 12, the adhesive 16 contained in a minute space between the rotary member 14 and the color filter disk 12 is sealed from the air thus promoting the hardening of the anaerobic adhesive 16.

Step 3: An ultraviolet ray is irradiated on the portion 16a of the adhesive 16 sticking out along the circumferential surface 14a of the rotary 14, so that the hardening of the portion 16a of the UV-curable adhesive 16 is promoted.

Step 4: A heat treatment is applied as needed, so that the hardening of the adhesive 16 is further promoted.

The color wheel 10 described above achieves the following advantage. The portion 16a of the adhesive 16, which sticks out on the side surface 12a of the color filter disk 12 along the circumferential surface 14a of the rotary member 14, is duly hardened and therefore functions as a barrier to prevent any uncured portions of the adhesive 16 from getting scattered out in the radial direction on the color filter disk 12 when the color wheel 10 is rotated at a high speed at the inspection process, or the like. Since the barrier is composed of the adhesive 16 used for fixing the color filter disk 12 and the rotary member 14, and is formed simultaneously during the fixing process conventionally performed in a usual manufacturing method, specifically such that the rotary member 14 is fitted and pressed to the center portion of the color filter disk 12 with the adhesive 16 applied therebetween, there is no cost increase involved.

Further, when a UV-curable anaerobic adhesive is used as the adhesive 16, the adhesive 16 applied between the color filter disk 12 and the rotary member 14 is readily hardened at ambient temperatures. Consequently, a heat treatment process for hardening an adhesive is eliminated, thus achieving reduction in equipment cost and manufacturing cost. Also, since the portion 16a of the adhesive 16, which sticks out on the side surface 12a of the color filter disk 12 along the circumferential surface 14a of the rotary member 14, is completely hardened with irradiation of an ultraviolet ray, the portion 16a is adapted to surely prevent uncured portions, if any, of the adhesive 16 from getting scattered out. And, the adhesive 16, while cured, undergoes a relatively small volume change, and therefore a relatively small stress is applied to the color filter disk 12, thus reducing the risk of disk cracking problem.

The amount of the portion 16a of the adhesive 16 is minimized insofar as uncured portions of the adhesive 16 can be duly prevented from getting scattered out. The adhesive 16 is applied in such an amount as to securely fix the rotary member 14 to the color filter disk 12 and to allow the portion 16a to be optimally dimensioned for duly serving the purpose.

Figure 3:
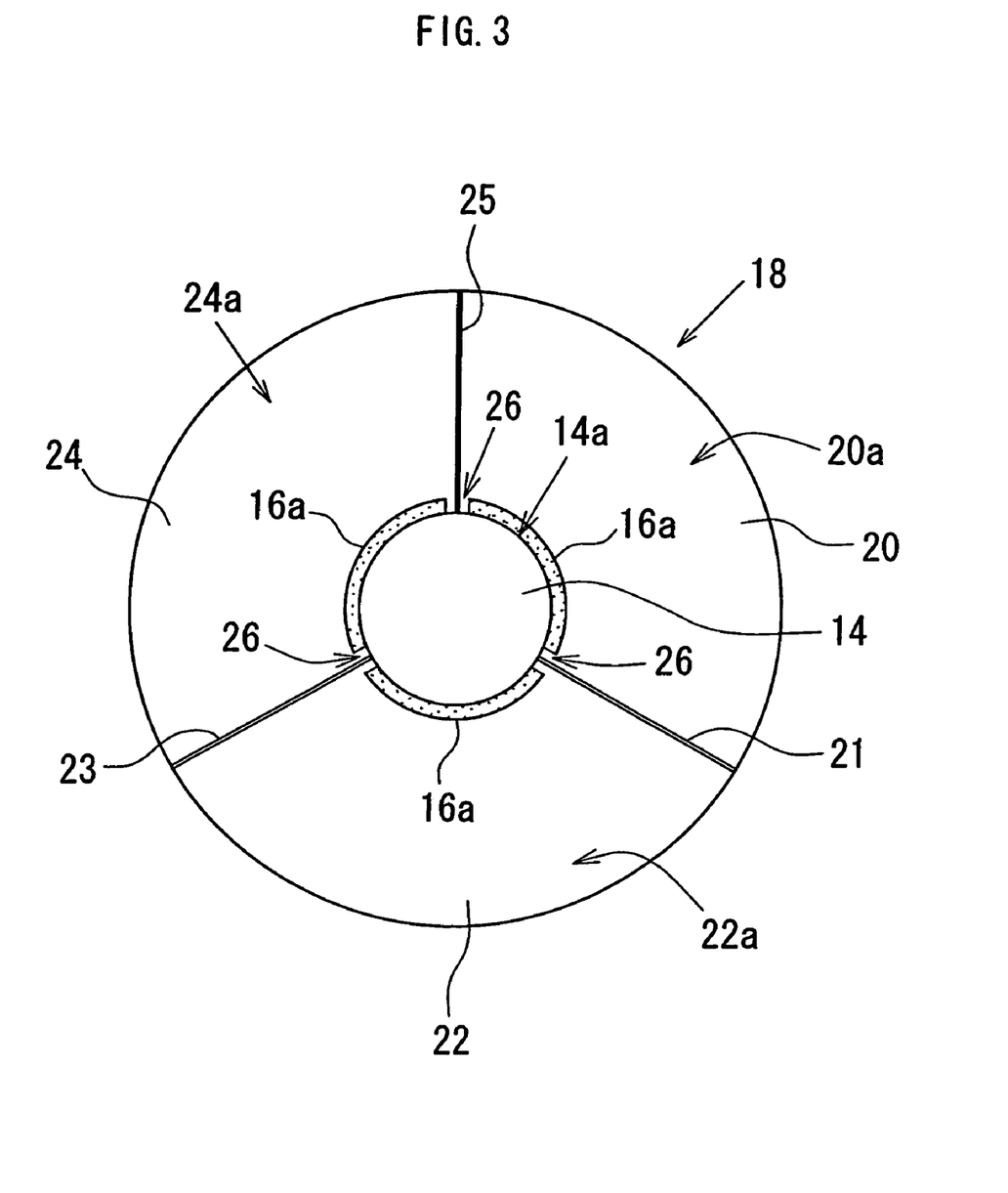
FIG. 3 is a schematic top plan view of a color wheel according to a second embodiment of the present invention.

A second embodiment of the present invention will be described with reference to FIG. 3. A color wheel 18 according to the second embodiment is a segment-type color wheel, and in explaining the example of FIG. 3, any component parts corresponding to those in FIGS. 1, 2A and 2B are denoted by the same reference numerals, and a detailed description thereof will be omitted below.

The color wheel 18 includes a plurality (three in the figure) of color filter segments 20, 22 and 24 disposed so as to constitute a color filter disk, and a rotary member 14 adhesively attached to the center portion of the color filter disk. The color wheel 18 in the present embodiment is structured by three color filter segments, but the present invention is not limited to such a structure and four or more color filter segments may be included. The rotary member 14 is generally a support member but may alternatively be a motor hub, or other rotating components.

Adhesive applied between the rotary member 14 and the color filter disk for fixing both components sticks out to form portions 16a respectively on side surfaces 20a, 22a and 24a of the color filter segments 20, 22 and 24 along a circumferential surface 14a of the rotary member 14 in such a manner as to keep off gaps 21, 23 and 25 each formed between two adjacent pieces of the color filter segments 20, 22 and 24, thus the portions 16a of the adhesive 16 are separated from each other so as to form voids 26 at respective gaps 21, 23 and 25.

The manufacturing procedure for the color wheel 18 is different from the procedure for the color wheel 10 in the following. A process of setting the color filter segments 20, 22 and 24 into a disk configuration as a color filter disk is performed either before or after the aforementioned Step 1, and an adhesive is applied to the rotary member 14 so as to keep off portions corresponding to the gaps 21, 23 and 25 in the Step 1. Further, in the aforementioned Step 2, the rotary member 14 with an adhesive applied as described above is oriented with respect to the color filter disk such that the portions with no adhesive coincide with the gaps 21, 23 and 25.

Thus, in the color wheel 18 according to the second embodiment of the present invention, an adhesive is applied so as to keep off the gaps 21, 23 and 25 each formed between two adjacent pieces of the color filter segments 20, 22 and 24, and consequently the adhesive applied can be surely prevented from getting in the gaps 21, 23 and 25. This surely avoids the problem of the adhesive getting in the gaps 21, 23 and 25 so as to have negative effects on the optical characteristic of a light transmitting area.

In the segment-type color wheel 18, depending on circumstances, an adhesive may be applied entirely to the peripheral portion of the rotary member 14 in the same way as in the monolithic-type color wheel 10 shown in FIGS. 1, 2A and 2B.

The description is omitted of the advantages that are achieved by the segment-type color wheel 18 and that are same as those achieved by the monolithic-type color wheel 19.

What is claimed is:

1. A color wheel comprising:
   a color filter disk having a side surface and a plurality of color filter segments arranged so as to form a disk-like configuration; and
   a rotary member having a circumferential surface and adhesively attached to a center portion of the color filter disk, wherein a portion of an adhesive applied to an interface area between the color filter disk and the rotary member for fixing the rotary member to the color filter disk sticks out on the side surface of the color filter disk along the circumferential surface of the rotary member, wherein the adhesive is kept off gaps formed between two adjacent pieces of the plurality of color filter segments.

2. A color wheel according to claim 1, wherein the adhesive is photo-curable.

3. A color wheel according to claim 2, wherein the adhesive is UV-curable and anaerobic.

4. A manufacturing method of a color wheel comprising: a color filter disk having a side surface; and a rotary member having a circumferential surface and adhesively attached to a center portion of the color filter disk, the manufacturing method comprising the steps of:
   applying an adhesive to at least one of a joint surface of the rotary member and a joint surface of the color filter disk;
   fitting and pressing the rotary member to the center portion of the color filter disk so that a portion of the adhesive existing between the rotary member and the color filter disk sticks out on the side surface of the color filter disk along the circumferential surface of the rotary member;
   hardening the and
   setting a plurality of color filter segments into a disk-like configuration thereby forming the color filter disk, wherein the adhesive is kept off gaps formed between two adjacent pieces of the plurality of color filter segments.

5. A manufacturing method of a color wheel, according to claim 4, wherein the adhesive is UV-curable and anaerobic, and wherein the adhesive existing between the rotary member and the color filter disk is hardened by fitting and pressing the rotary member to the center portion of the color filter disk, while the portion of the adhesive sticking out on the side surface of the color filter disk along the circumferential surface of the rotary member is hardened by irradiating an ultraviolet ray.

* * * * *